(12) United States Patent
Goldman et al.

(10) Patent No.: US 8,098,798 B2
(45) Date of Patent: Jan. 17, 2012

(54) LOGGING CALL DATA FOR FAILED EMERGENCY CALLS

(75) Inventors: Stuart O. Goldman, Scottsdale, AZ (US); Richard E. Krock, Naperville, IL (US); Bernard L. Malone, III, Little Rock, AK (US); Karl F. Rauscher, Emmaus, PA (US); James P. Runyon, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1131 days.

(21) Appl. No.: 11/590,464

(22) Filed: Oct. 31, 2006

(65) Prior Publication Data

US 2008/0101553 A1    May 1, 2008

(51) Int. Cl.
*H04M 11/04*    (2006.01)

(52) U.S. Cl. .................. 379/45; 379/46; 379/207.15

(58) Field of Classification Search ............ 379/45, 379/207.15
See application file for complete search history.

(56) References Cited

U.S. PATENT DOCUMENTS

| 5,323,444 | A | * | 6/1994 | Ertz et al. ...................... 379/45 |
| 6,041,112 | A | * | 3/2000 | Malik ..................... 379/209.01 |
| 6,078,647 | A | * | 6/2000 | D'Eletto .................. 379/32.01 |
| 6,201,856 | B1 | * | 3/2001 | Orwick et al. ................. 379/40 |
| 6,529,592 | B1 | * | 3/2003 | Khan ..................... 379/114.01 |
| 6,671,350 | B1 | * | 12/2003 | Oxley ............................ 379/45 |
| 6,804,329 | B2 | * | 10/2004 | Geck et al. ..................... 379/45 |
| 7,035,381 | B2 | * | 4/2006 | D'Ascenzo et al. ............ 379/45 |
| 7,822,414 | B2 | * | 10/2010 | Bender et al. ................. 455/423 |
| 7,864,927 | B2 | * | 1/2011 | Loizeaux ..................... 379/37 |
| 2004/0102178 | A1 | * | 5/2004 | Williams .................. 455/404.1 |
| 2006/0262907 | A1 | * | 11/2006 | Diroo et al. ..................... 379/45 |
| 2007/0269024 | A1 | * | 11/2007 | Dalrymple et al. ............. 379/37 |

* cited by examiner

*Primary Examiner* — Simon Sing
(74) *Attorney, Agent, or Firm* — Fay Sharpe LLP

(57) ABSTRACT

A method of logging call data for failed emergency calls includes: receiving from a calling party an emergency call that is to be routed to a Public Safety Answering Point (PSAP) (40) over a telecommunications network (20); determining if the received emergency call is connected to the PSAP (40); and, if the received emergency call fails to be connected to the PSAP (40), then capturing selected call data regarding the failed emergency call and recording the captured call data.

21 Claims, 1 Drawing Sheet

LOGGING CALL DATA FOR FAILED EMERGENCY CALLS

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

In general, it is known to use a telecommunications network, e.g., such as the Public Switched Telephone Network (PSTN) or the like, to complete an emergency call, e.g., such as a 9-1-1 call or the like. Typically, such an emergency call is directed in the usual manner to a designated Public Safety Answering Point (PSAP) or other like network facility that serves the calling party or is otherwise situated to receive the emergency call. However, e.g., in times of natural catastrophe, disaster or other emergencies affecting a large population or a significant number of individuals, a PSAP serving those individuals can be overwhelmed with emergency calls or otherwise unable to receive one or more of the emergency calls. Further, a PSAP itself may be out of service. For example, the PSAP may be unreachable due to the unusually large call volume and/or network congestion typically associated with significant disasters or the network may have been damaged or otherwise impaired by the catastrophe and be unable to route emergency calls to their designated PSAP. In either case, one or more parties placing emergency calls may not ultimately be connected to or otherwise reach the PSAP in such circumstances. They may, for example, get a busy signal or otherwise experience some type of connection failure. Often, depending on the specific nature and/or severity of a particular individual's emergency, the calling party may simply remake the emergency call or otherwise reattempt to connect with the PSAP if a busy signal is received or other connection failure is experienced. Still, if the PSAP has directed thereto significantly more calls than it is equipped to handle, then the overwhelmed state can persist for some time, and consequently, one or more calling parties may experience some type of connection failure on repeated attempts.

Ultimately, an individual who would still want or otherwise benefit from emergency assistance may abandon further attempts after some number of emergency calls fail to connect with or be answered by the PSAP. Such a result is generally undesirable in so much as those individuals typically cannot be conveniently identified so that suitable emergency assistance can be dispatched or other actions taken as is deemed appropriate in particular instances. That is to say, heretofore, there has been no suitable method and/or no suitable facilities or elements implemented within the network that would track and/or record emergency call data for emergency calls that failed to connected with their respective PSAP, in such a manner so that after the fact (i.e., after the failed emergency calls had been placed) the data could be readily accessible and/or easily usable for the purpose of rendering aid or assistance to the parties placing the failed emergency calls.

Accordingly, a new and improved method and/or system for logging emergency call data is disclosed that overcomes the above-referenced problems and others.

SUMMARY

In accordance with one embodiment, a method of logging call data for failed emergency calls is provided. The method includes: receiving from a calling party an emergency call that is to be routed to a Public Safety Answering Point (PSAP) over a telecommunications network; determining if the received emergency call is connected to the PSAP; and, if the received emergency call fails to be connected to the PSAP, then capturing selected call data regarding the failed emergency call and recording the captured call data.

In accordance with another embodiment, a system for logging call data for failed emergency calls includes: receiving means for receiving from a calling party an emergency call that is to be routed to a Public Safety Answering Point (PSAP) over a telecommunications network; detecting means for detecting if the emergency call received by the receiving means is connected to the PSAP; capturing means for capturing selected call data regarding the emergency call if the emergency call fails to be connected to the PSAP; and, recording means for recording call data captured by the capturing means.

In accordance with yet another embodiment, a telecommunications network includes: a Public Safety Answering Point (PSAP) to which emergency calls are routed; an originating node that provides a calling party access to the telecommunications network, the originating node, upon receiving an emergency call from the calling party, attempting to connect the emergency call to the PSAP over the telecommunications network; and, a failed emergency call log in which call data related the emergency call is recorded in response to a failed attempt to connect the emergency call to the PSAP.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
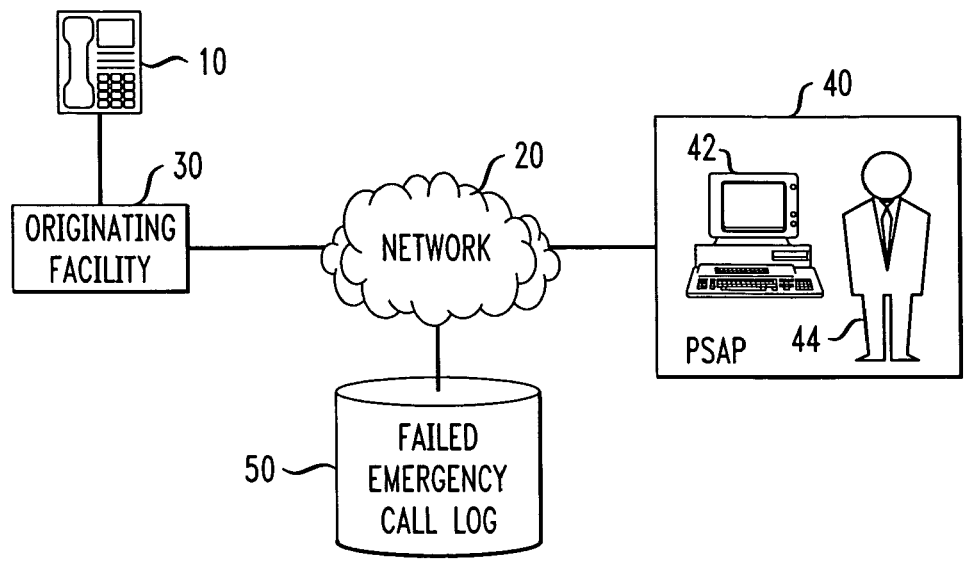
FIG. 1 is a block diagram illustrating an exemplary telecommunications network suitable for practicing aspects of the present inventive subject matter.

With reference to FIG. 1, a calling party uses an end user terminal or end instrument or originating station or terminal 10 to selectively place or originate telephone calls over a telecommunications network 20, e.g., a public switched telephone network (PSTN). Suitably, the terminal 10 receives service and/or obtains access to the network 20 via an originating exchange, switching facility, end office (EO) or other network node or telecommunications facility 30 that is operatively connected to and/or in communication with the network 20 in the usual manner. While for simplicity and clarity herein only one originating terminal 10 and one originating facility 30 are illustrated in the present example, it is to be appreciated that any one facility suitably serves a plurality of similarly situated terminals and that a plurality of such facilities are similarly equipped and/or likewise arranged with respect to the network 20.

Suitably, the terminal 10 and facility 30 are implemented in either a landline or wireline configuration or a wireless or mobile configuration. For example, in a landline or wireline configuration, the terminal 10 is optionally a landline telephone or other like end user telecommunication device or landline customer premises equipment (CPE), and the facility 30 serving the terminal 10 is an EO, exchange or other network node that is operatively connected to the network 20 (e.g., the PSTN) in the usual manner. Suitably, the EO, exchange or other like network node includes a telecommunications switch (e.g., a class 5 switch such as the 5ESS or another SS7 switch or other like switch) to which the terminal 10 is operatively connected in the usual manner, e.g., via a twisted-pair landline cable, wire or the like. In a wireless or mobile configuration, e.g., the facility 30 serving the terminal 10 is optionally a mobile switching center (MSC) or other like network node operatively connected to and/or in communication with the network 20 in the usual manner. Suitably, the MSC is also operatively connected to and/or in communication with a plurality of base stations (not shown) in the usual manner. As is understood in the art, each base station (BS) provides an over-the-air radio frequency interface for its respective geographic area or cell. Selectively, the terminal 10 (which in this embodiment is optionally a mobile or wireless telephone or other appropriate mobile station (MS)) is provided telecommunication services and/or otherwise accesses the network 20 via the interface and/or the BS serving the cell in which the MS is located.

Moreover, while described herein generally with reference to emergency calls placed via a traditional voice modality, it is to be appreciated that the present inventive subject matter is also applicable to other emergency communication modalities, e.g., including text messaging, short message service (SMS), e-mail, instant messaging (IM), VoIP (Voice over Internet Protocol (IP)), etc. Optionally, the originating or network access providing facility 30 includes and/or is implemented as a next generation network (NGN) server. Suitably, the terminal 10 connects to the NGN server via an appropriate network connection, e.g., such as an Internet Protocol (IP) connection or the like.

In a suitable embodiment, the facility 30 and/or the applicable switching or other equipment contained therein is also provisioned with an emergency call service or feature. Accordingly, when the terminal 10 is used to place an emergency call (e.g., by dialing 9-1-1 in the United States of America or another emergency telephone number or code as may be the case in other countries), the facility 30 serving the terminal 10 recognizes the call as an emergency call, and routes the call over the network 20 to a designated PSAP 40, e.g., one serving the geographic area in which the terminal 10 is located. Upon receiving the call, the PSAP 40 suitably routes and/or otherwise connects the call to a workstation 42 of an available PSAP operator or call taker 44. For simplicity and clarity herein, only one PSAP and one workstation are illustrated in the present example. However, it is to be appreciated that a single PSAP is suitably provisioned with a plurality of workstations in the usual manner and that a plurality of PSAPs are similarly equipped and/or likewise arranged with respect to the network 20.

If the emergency call is ultimately answered by the PSAP 40, then in the usual manner a signal, message or other appropriate indication of the same is returned to the originating facility 30. Accordingly, the facility 30 simply completes the call set-up in a conventional manner so that the call is connected through the network 20 to the PSAP 40. Alternately, if the call is not answered by the PSAP 40 or some other type of call failure is experienced, then the facility 30 does not receive the aforementioned signal or message indicating that the call has been answered by the PSAP 40. Rather, the facility 30 optionally receives a signal or message or other indication that the PSAP 40 is unavailable to complete connection of the call, i.e., the PSAP 40 may for example be busy or overwhelmed with other calls. Alternately, the calling party may simply abandon the call (e.g., hand-up) prior to the PSAP 40 answering the call; or, the network 20 may not be able to route the call to the PSAP 40, e.g., due to network damage. In any of the aforementioned events, the facility 30 recognizes that the emergency call was not ultimately connected to or otherwise answered by the PSAP 40. Accordingly, in response to this recognition, the facility 30 invokes a logging function or service to capture and record the relevant call data, e.g., the date and/or time of the call, the telephone number and/or other identifying information for the terminal 10 and/or the calling party, the location of the terminal 10 and/or the calling party (which may vary in wireless or mobile cases), etc. More specifically, the captured and/or recorded call data may vary depending upon the type of call and it may optionally include:

- the originating node identity (e.g., Point Code, CLLI code location, IP address, or other node identifier), geographic location, and/or contact information;
- the dialed digits (e.g., 9-1-1), IP SIP URN SOS code, IM SOS, e-mail SOS, etc.;
- the identity of the calling party, e.g., the mobile number of calling party for wireless, the DN (directory number) for wireline, IP address for IP based calls (e.g., VoIP, etc.);
- the time of call attempt (optionally including time zone or normalized to GMT);
- location data of caller; and/or,
- the reason for call failure (e.g., a code that indicates the particular reason for the call failure, i.e., caller hung-up before the call was answered or the PSAP was busy, or the network could not route the call due to network damage or network congestion; or some other reason for the failure).

Figure 2:
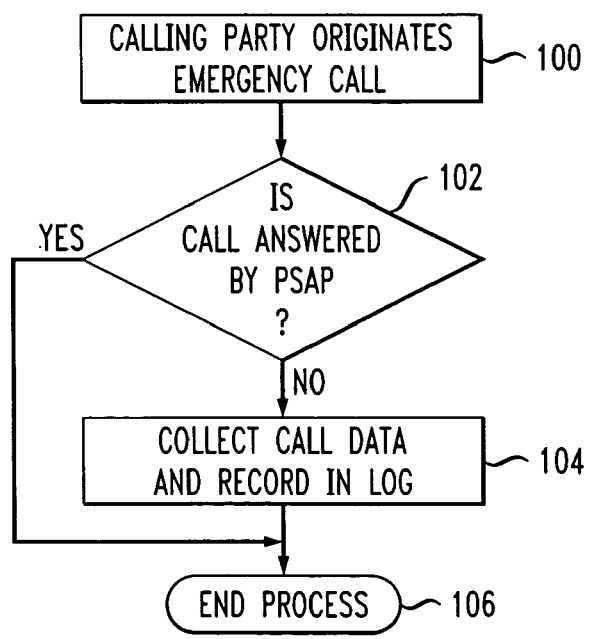
FIG. 2 is a flow chart showing an exemplary process embodying aspects of the present inventive subject matter.

With reference to FIG. 2, a flow chart provides an example of how the failed emergency call logging service/feature is administered. As illustrated, the process begins at step 100 with the calling party employing the terminal 10 served by the facility 30 to place or originate an emergency call over the network 20. At decision step 102, it is determined if the call is answered or otherwise connected to the PSAP 40. If indeed the call is answered by and/or connected to the PSAP 40, then the call logging service and/or feature is bypassed, i.e., as shown, step 104 is skipped as the flow branches to the end of the process (step 106). Alternately, if the call is unanswered or the call is not in fact connected to the PSAP 40 or some form of call failure is otherwise experienced, then the failed emergency call logging service and/or feature is invoked at step 104. Suitably, at step 104 the relevant call data is captured by the originating facility 30 and recorded or otherwise saved in a log 50, e.g., implemented as a database or other suitable data storage location. Optionally, depending on local policy or other considerations, the facility 30 and/or equipment therein is selectively configurable so that the failed emergency call logging feature is on (i.e., activated) or off (i.e., deactivated) as desired.

When the failed emergency call logging feature or service is activated, optionally, the record of the failed emergency call is stored at the originating facility 30. Alternately, as shown in FIG. 1, the record is sent by the facility 30 to a common database or other data storage location (i.e., log 50) which is accessible via the network 20 or otherwise by designated officials using an appropriate computer, terminal, workstation or other suitable access device. For example, an authorized agent or individual (optionally located at the PSAP 40 or elsewhere) may employ a computer, terminal or workstation to access the database/log 50 over the Internet or another suitable network. In one suitable embodiment, when a call data record for a failed emergency call is sent to or received by or otherwise recorded in the database/log 50, optionally, notification of the same is sent to a designated address or telephone number for authorized agency or other entity that is responsible for monitoring the database and/or log 50 and selectively taking action as deemed appropriate based on the data contained in the database/log 50. Suitably, the notification is sent from the facility 30 in conjunction with call data being forwarded or otherwise recorded in the database or log 50. Alternately, the database/log 50 is provisioned to sent the notification in response to receiving the call data record. In addition, periodic reminders are also optionally sent to the authorized agency or entity so long as the database/log 50 contains unresolved records for failed emergency calls.

Optionally, there are a number of suitable methods for transmitting the call failure record from the originating node 30 to the database 50, including using, e.g., a Signaling System 7 (SS7) address (i.e., point code, translation type and subsystem), e-mail address, Web URL (Uniform Resource Locator), or SIP (Session Initiation Protocol) destination address. Suitably, the transmission uses methodologies such as T1, ethernet, Internet, e-mail, satellite, WiFi, HTML (Hypertext Mark-up Language), text message, etc.

As can be appreciated, the database or log 50 allows the appropriate agency or officials to review the failed emergency calls to identify patterns, and determine which failed emergency calls if any should be given further treatment, e.g., such as a return call, dispatch of aid, etc. Optionally, the data stored in the database/log 50 is only made available to the authorized agency and/or officials and not to the general public. Accordingly, appropriate precautions (e.g., data encryption, password protected or other type of secure log-in, etc.) are optionally taken to protect against unauthorized access to the database/log 50. Suitably, logging the failed emergency calls is transparent to the caller, e.g., optionally they are not asked to leave a message. In the case of wireless calls, optionally, the identity of the cell tower that serviced the failed emergency call is also made part of the record so that the location of the caller can be determined, as well as providing the ability to track movement of wireless callers who may make repeated calls.

In one exemplary embodiment, the agency or official accessing the database/log 50 is able to selectively process the data therein in any one or more various ways to detect patterns or find particular records of interest. Suitably, e.g., post-processing options may include searching, filtering and/or sorting the data based on any number of selected criteria. The following is an exemplary non-exhaustive list of useful data processing options:

filtering or sorting the data based on a particular calling party's telephone number or other, identifier to determine how many failed emergency calls have been made thereby (e.g., a large number of repeat calls may indicate a degree of urgency the caller perceives, while a single non-repeated call may indicate that the emergency for that individual has since been resolved);

filtering or sorting the data based upon the emergency call failure code;

filtering or sorting the data to determine the number of failed emergency call attempts from the same telephone number within a selected time window (e.g., this would be indicative of a problem believed to be serious by the caller that remains unresolved);

filtering or searching for one specific mobile number to produce a list of multiple call attempts at different times, and optionally also showing multiple (i.e., changing) locations, if the caller was moving (e.g., a change in location may be indicative of an individual moving away or towards a disaster areas, and knowing this information may help prioritize responses).

Ultimately, any number of different patterns and/or information can be gleaned by selectively searching, filtering and/or sorting the data in particular ways as deemed desirable by the agency or official processing the data. Suitably, in response to the patterns identified and/or information gleaned, the agency and/or official is able to take whatever action is felt to be most advisable, prioritize responses for particular callers, etc.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of logging call data for failed emergency calls, said method comprising:

(a) receiving from a calling party an emergency call that is to be routed to a Public Safety Answering Point (PSAP) over a telecommunications network;

(b) determining if the received emergency call is connected to the PSAP;

(c) if the received emergency call fails to be connected to the PSAP, then capturing selected call data regarding the failed emergency call;

(d) forwarding and recording the captured call data in a failed emergency call log accessible to an authorized official at the PSAP such that the authorized official can review the captured call data to determine if further treatment of the failed emergency call is appropriate;

(e) sending a notification to the authorized official that the captured call data for the failed emergency call was recorded in the failed emergency call log; and (f) sending a periodic reminder to the authorized official that the captured call data for the failed emergency call is recorded in the failed emergency call log until the failed emergency call is resolved;

wherein the captured call data includes an indication of a reason the emergency call failed to be connected to the PSAP.

2. The method of claim 1 wherein the call data is maintained in the failed emergency call log so as to be searchable by the authorized official upon accessing the same in accordance with criteria selected thereby.

3. The method of claim 1 wherein the call data is maintained in the failed emergency call log so as to be filterable by the authorized official upon accessing the same in accordance with criteria selected thereby.

4. The method of claim 1 wherein the call data is maintained in the failed emergency call log so as to be sortable by the authorized official upon accessing the same in accordance with criteria selected thereby.

5. The method of claim 1 wherein, if the calling party hangs up before the emergency call is answered by the PSAP, the reason the emergency call failed in the captured call data includes a code indicating the calling party hung up before the emergency call was answered.

6. The method of claim 1 wherein, if the PSAP could not answer the emergency call because it was busy, the reason the emergency call failed in the captured call data includes a code indicating the PSAP was busy.

7. The method of claim 1 wherein, if the telecommunications network could not route the call to the PSAP, the reason the emergency call failed in the captured call data includes a code indicating the emergency call could not be routed.

8. The method of claim 1, further comprising:
(e) sending a notification to the authorized official that the captured call data for the failed emergency call was forwarded to the failed emergency call log.

9. A system for logging call data for failed emergency calls, said system comprising:
receiving means for receiving from a calling party an emergency call that is to be routed to a Public Safety Answering Point (PSAP) over a telecommunications network;
determining means for determining if the emergency call received by the receiving means is connected to the PSAP;
capturing means for capturing selected call data regarding the emergency call received by the receiving means if the received emergency call fails to be connected to the PSAP;
recording means for forwarding and recording call data captured by the capturing means in a failed emergency call log accessible to an authorized official at the PSAP such that the authorized official can review the captured call data to determine if further treatment of the failed emergency call is appropriate;

notifying means for sending a notification to the authorized official that the captured call data for the failed emergency call was recorded in the failed emergency call log; and means for sending a periodic reminder to the authorized official that the captured call data for the failed emergency call is recorded in the failed emergency call log until the failed emergency call is resolved;

wherein the captured call data includes an indication of a reason the emergency call failed to be connected to the PSAP.

10. The system of claim 9 wherein the call data is maintained in the failed emergency call log so as to be searchable by the authorized official upon accessing the same in accordance with criteria selected thereby.

11. The system of claim 9 wherein the call data is maintained in the failed emergency call log so as to be filterable by the authorized official upon accessing the same in accordance with criteria selected thereby.

12. The system of claim 9 wherein the call data is maintained in the failed emergency call log so as to be sortable by the authorized official upon accessing the same in accordance with criteria selected thereby.

13. The system of claim 9 wherein, if the calling party hangs up before the emergency call is answered by the PSAP, the reason the emergency call failed in the captured call data includes a code indicating the calling party hung up before the emergency call was answered.

14. The system of claim 9 wherein, if the PSAP could not answer the emergency call because it was busy, the reason the emergency call failed in the captured call data includes a code indicating the PSAP was busy.

15. The system of claim 9 wherein, if the telecommunications network could not route the call to the PSAP, the reason the emergency call failed in the captured call data includes a code indicating the emergency call could not be routed.

16. The system of claim 9, further comprising:
means for sending a notification to the authorized official that the captured call data for the failed emergency call was forwarded to the failed emergency call log.

17. A telecommunications network comprising:
a Public Safety Answering Point (PSAP) to which emergency calls are routed;
an originating node that provides a calling party access to the telecommunications network, said originating node, upon receiving an emergency call from the calling party, attempting to connect the emergency call to the PSAP over the telecommunications network, determining if the received emergency call is connected to the PSAP, and, if the received emergency call fails to be connected to the PSAP, capturing selected call data regarding the failed emergency call; and,
a failed emergency call log accessible to an authorized official at the PSAP to which the captured call data is forwarded by the originating node, wherein the captured call data is recorded such that the authorized official can review the captured call data to determine if further treatment of the failed emergency call is appropriate;
wherein the captured call data recorded in the failed emergency call log includes an indication of a reason the emergency call failed to be connected to the PSAP;
wherein a notification is sent to the PSAP to notify the authorized official that the captured call data for the failed emergency call was recorded in the failed emergency call log;
wherein a periodic reminder is sent to the PSAP to remind the authorized official that the captured call data for the failed emergency call is recorded in the failed emergency call log until failed emergency call is resolved.

18. The telecommunications network of claim 17 wherein a notification is sent to the PSAP to notify the authorized official that the captured call data for the failed emergency call was forwarded to the failed emergency call log.

19. The telecommunications network of claim 17 wherein, if the calling party hangs up before the emergency call is answered by the PSAP, the reason the emergency call failed in the captured call data includes a code indicating the calling party hung up before the emergency call was answered.

20. The telecommunications network of claim 17 wherein, if the PSAP could not answer the emergency call because it was busy, the reason the emergency call failed in the captured call data includes a code indicating the PSAP was busy.

21. The telecommunications network of claim 17 wherein, if the telecommunications network could not route the call to the PSAP, the reason the emergency call failed in the captured call data includes a code indicating the emergency call could not be routed.

* * * * *